United States Patent [19]

Borsanyi

[11] 4,437,990

[45] Mar. 20, 1984

[54] SEMIPERMEABLE MEMBRANE MASS TRANSFER APPARATUS HAVING SLOTTED SUPPORT MEMBERS

[75] Inventor: Alexander S. Borsanyi, Newport Beach, Calif.

[73] Assignee: American Hospital Supply Corporation, Evanston, Ill.

[21] Appl. No.: 332,324

[22] Filed: Dec. 18, 1981

Related U.S. Application Data

[63] Continuation of Ser. No. 44,072, May 21, 1979, abandoned, which is a continuation-in-part of Ser. No. 779,577, Mar. 21, 1977, abandoned.

[51] Int. Cl.³ .......................................... B01D 31/00
[52] U.S. Cl. ................................ 210/321.3; 210/493.1
[58] Field of Search ................ 210/321.3, 321.4, 493.1

[56] References Cited

U.S. PATENT DOCUMENTS 4,028,252 6/1977 Morris ............................. 210/321.3
4,199,457 4/1980 Esmund .

Primary Examiner—Frank A. Spear, Jr.
Attorney, Agent, or Firm—Tilton, Fallon, Lungmus

[57] ABSTRACT

A mass transfer apparatus for use in hemodialysis and ultrafiltration wherein a semi-permeable membrane is folded to form a stack of accordion pleats and is arranged within a ported housing to form two separate fluid chambers for blood and dialysate. A plurality of discrete planar support members of open-mesh plastic material are associated with the membrane, such support members each being flat and unfolded, and preferably being arranged to provide a pair of such members in superimposed contiguous relation within each pleat only on the dialysate side of the membrane. One of the support members of each contiguous pair has at least one transverse slot which extends the full thickness of that member and in which the plastic material of that member is completely absent. The transverse slot extends away from an edge of the one support member facing towards a blood flow port of the housing and terminates short of the opposite edge of that support member.

4 Claims, 9 Drawing Figures

SEMIPERMEABLE MEMBRANE MASS TRANSFER APPARATUS HAVING SLOTTED SUPPORT MEMBERS

RELATED APPLICATION

This is a continuation of application Ser. No. 44,072, filed May 21, 1979, which in turn is a continuation-in-part of Ser. No. 779,577, filed Mar. 21, 1977, now abandoned.

BACKGOUND OF THE INVENTION

The present invention relates broadly to a mass transfer apparatus including a semipermeable membrane element folded several times upon itself. For convenience, it is described hereinafter for the particular case where such an apparatus is used for the treatment of blood by hemodialysis and/or by ultrafiltration; and more particularly, such an apparatus which is of relatively small size, economical, suitable to be used at home, and discarded after use.

The invention relates more particularly to an apparatus comprising, inside of a fluid-tight casing provided with the necessary ports for introduction and evacuation of blood, dialysate and/or ultrafiltrate, a semipermeable membrane folded upon itself to form a stack of accordion pleats to thereby define two fluid chambers, with support members or spacers disposed within all those pleats which are on one side of the membrane.

Apparatus of this general type is known: for example, see U.S. Pat. No. 3,788,482 to Markley. With the usual hemodialyzer membranes of relatively low middle molecule clearance characterisitcs, however, only narrow pleats can be used, as otherwise blood enters and leaves with difficulty and does not become uniformly spread over all the surfaces of the pleats of the membrane. With membranes allowing better performance, particularly in ultrafiltration, such as the polyacrylonitrile membranes described in Rhone-Poulenc's British Pat. No. 1,327,990, which may be thicker and stiffer than those just mentioned, it becomes still more difficult to secure the penetration of the blood through the apparatus with uniform distribution over the entire membrane and with a flow having an acceptably low pressure drop.

For solving these problems, some solutions have been already proposed. Thus, U.S. Pat. No. 3,780,870 to Esmond suggests the provision of two support members folded upon themselves, thereby forming four superposed layers in the compartments filled with dialysate with only one of those support members extending to the ends of the apparatus. Additional supports are disposed in the blood chamber. This design provides some channels at each end for the flow of blood. On the other hand, the size of such an apparatus for a given overall surface of membrane is greatly increased and the apparatus is not sufficiently economical. Besides, blood of which a greater volume is necessary comes directly into contact with the support members disposed at the ends of the apparatus. As these support members are generally constituted by screens which may have sharp edges on at least two opposite sides, it is necessary to take care (as indicated in U.S. Pat. No. 3,565,258 to Lavender et al.) not to risk coagulation of the blood. See also U.S. Pat. Nos. 3,862,031 and 3,757,955 to Leonard.

U.S. Pat. No. 3,612,281 to Leonard relates to an hemodialyzer of the same general type as the preceding one. It offers the same possibilities and the same drawbacks. Besides, the construction of this apparatus has the disadvantage of requiring the introduction and the withdrawal of temporary support members.

SUMMARY OF THE INVENTION

Accordingly, it is an object of the present invention to provide an apparatus of the kind indicated that eliminates or at least substantially minimizes problems and disadvantages of the prior art devices.

More precisely, it is an object of the present invention to provide an apparatus of simple and economical construction which allows an easy flow of blood under a small pressure drop and with uniform distribution of blood over the entire membrane, which requires only a limited volume of blood within the apparatus, and which nowhere permits the blood to come into contact with sharp edges of support members.

In accordance with the present invention, a fluid flow apparatus is provided which has a semipermeable membrane folded to form a stack of accordion pleats defining two series of fluid chambers extending inwardly from opposite sides of said stack, and planar support members disposed within the chambers of only one of said series (on the dialysate side where the transfer apparatus is a dialyzer), the planar support members consisting of a plurality of discrete open-mesh inserts having slots adjacent opposite ends thereof to facilitate the flow of fluid into and out of the chambers not containing such support members. In a modified form of the invention, a pair of superimposed support members or mesh inserts is disposed within each of the chambers of the one series and, in a further modification, only one of the inserts of each such pair is provided with such slots.

A still better understanding of the features of the present invention and its inherent advantages will become apparent from the follow description and reference to the accompanying drawings in which:

BRIEF DESCRIPTION OF THE DRAWINGS

FIG. 9 is an enlarged fragmentary sectional view similar to but less schematic than FIG. 5, showing details of the interrelationship of parts of the hemodialyzer.

DESCRIPTION OF PREFERRED EMBODIMENTS

Figure 1:
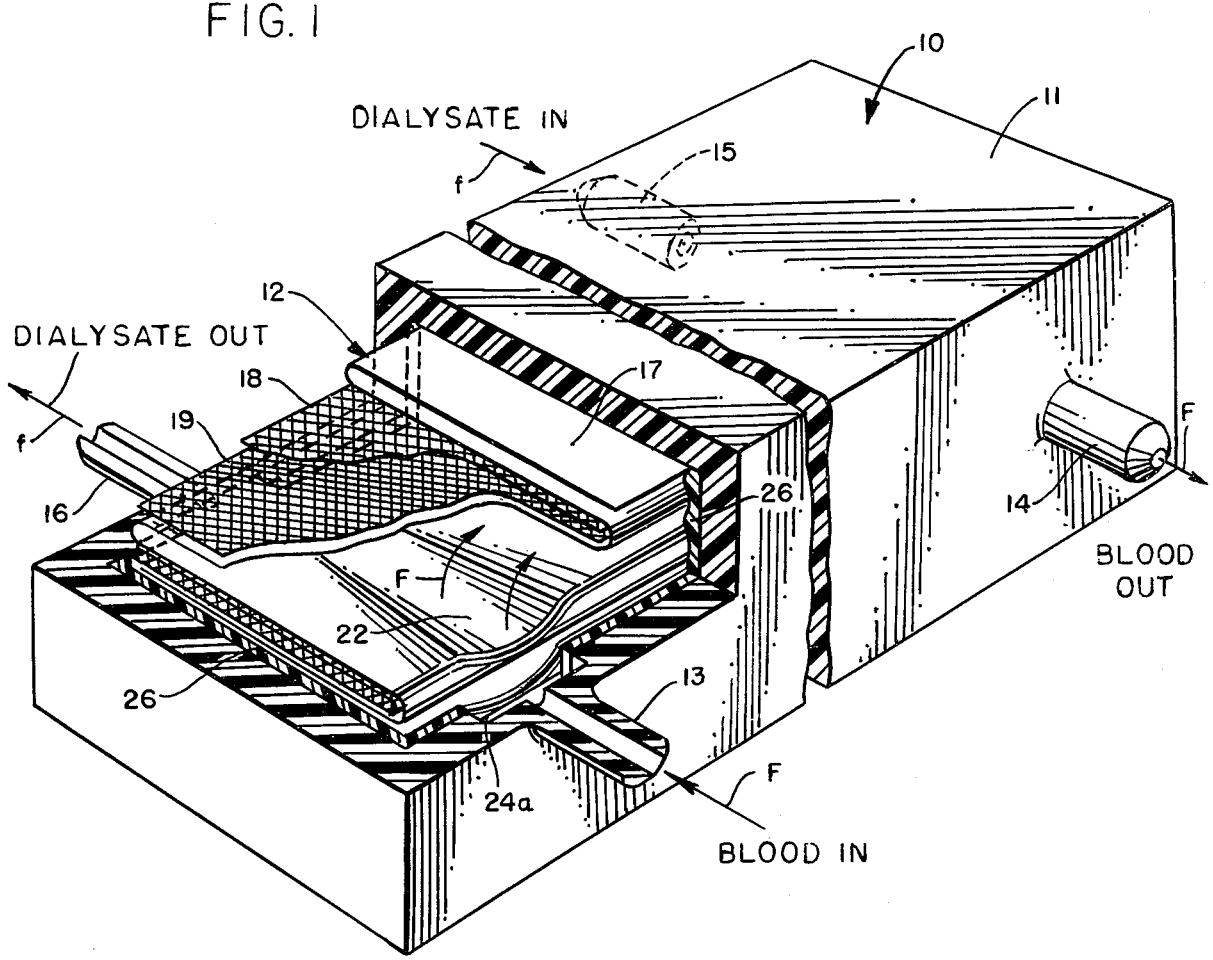
FIG. 1 is a perspective view of a hemodialyzer built in accordance with the present invention, partially broken away to expose its interior structure.

Referring now to the drawings in detail, it will be seen that there is illustrated in FIG. 1 a hemodialyzer construction in accordance with the present invention and identified by the numeral 10. This hemodialyzer includes a housing, preferably rectangular, generally identified by the numeral 11, and a core, generally identified by the numeral 12. This hemodialyzer is provided on one side with a blood inlet port 13 and a blood outlet port 14 and on the opposite side with a dialysate inlet port 15 and a dialysate outlet port 16. While ports 13–16 are shown in the drawings as being formed integrally with the housing, it is to be understood that they may instead be provided by headers which are secured directly to the core as disclosed in my co-pending application Ser. No. 9,444, filed Feb. 5, 1979. In that event, the ports still project from the housing after the core has been sealed therein, and in both cases the ports function to permit fluids to enter and exit from the housing.

Figure 4:
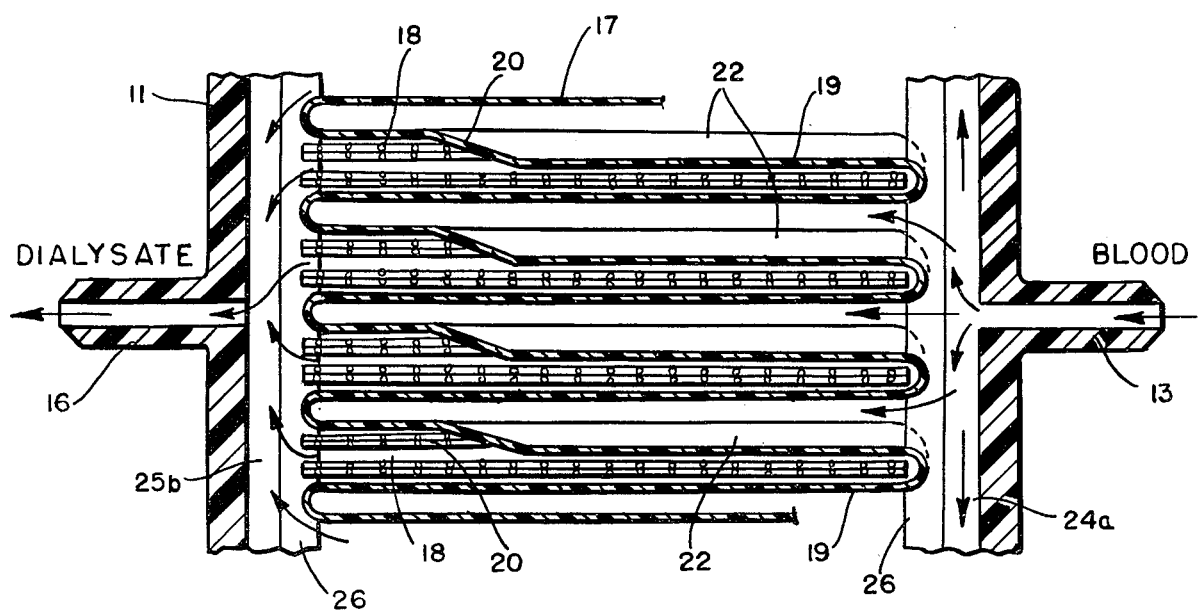
FIG. 4 is a somewhat schematic transverse sectional view taken along the line 4—4 of FIG. 2, showing that only one of the two support members is provided with a slot and that the membrane is supported in the region of the slot only by the other support member.
Figure 3:
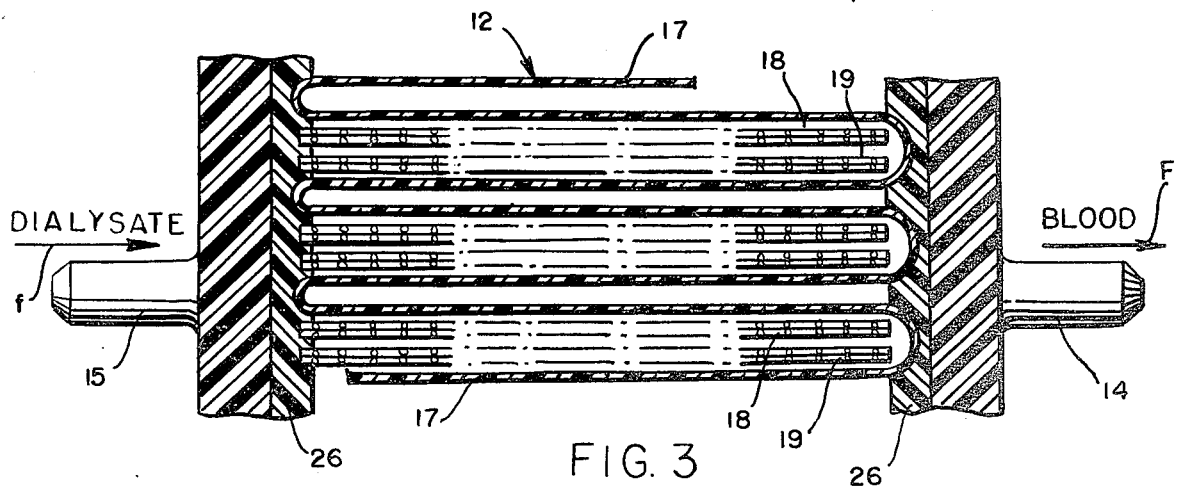
FIG. 3 is a somewhat schematic vertical transverse sectional view of the hemodialyzer taken along the line 3—3 of FIG. 2, showing a first embodiment of the present invention which comprises two support members disposed between every pair of pleats.

The core is formed of a single length of a flat semipermeable membrane 17 which is folded into a large number of closely spaced pleats which extend along the length of the housing and, as is most clearly seen in FIGS. 3 and 4, undulates back and forth across the width of the housing 11 and between the walls thereof. The two ends of the folded membrane are attached to or anchored in a conventional sealing plastic or potting compound 26.

The semipermeable membrane may be of any desired type permitting the diffusion of water and/or low and middle molecular weight substances (e.g., urea and vitamin $B_{12}$) from blood to another fluid through the membrane under conditions of relatively low transmembrane pressures. As suitable examples one may mention Cuprophan (a commercially available form of regenerated cellulose) or a polyacrylonitrile membrane as described in the British patent cited above or a polycarbonate membrane, the last two having a permeability of at last 0.05 cc $H_2O$/minute/sq. meter/mm. Hg. The present invention although adapted for use in hemodialysis in connection with Cuprophan membranes, is especially well adapted for use in connection with polyacrylonitrile or polycarbonate membranes where the optimum transmembrane pressure differential is lower than that for Cuprophan and especially for ultrafiltration.

Support members such as 18 and 19 are disposed within all those pleats which are on one side of the membrane 17, while those pleats on the opposite side of membrane 17 do not contain support members. The support members such as 18 and 19 are disposed in those pleats on the side of the membrane 17 which communicates with the dialysate inlet portion 15 and the dialysate outlet port 16. Owing to this arrangement, only the dialysate (and never the blood) comes into contact with any support members.

The two perforated support members, such as 18 and 19, are preferably non-woven plastic mesh supports of per se conventional design and configuration. As an example of a suitable material for the support members, one may employ Vexar which is a commercially-available polyolefin mesh material. Such a thermoplastic mesh may be readily fabricated for the support members by criss-crossing one set of filaments of polypropylene or the like with another set of similar filaments at an angle of approximately 90° to each other, and heat-sealing the juxtaposed filaments to give the desired open mesh arrangement having a thickness substantially equal to the diameter of the filaments except at the cross-over points where the thickness (due to the heat sealing) will be somewhat less than twice that of the filaments. In general, the total thickness of such a mesh should be the order of 15 to 50 mils. The resulting structure assures good support for the semipermeable membrane at the numerous cross-over points while affording intermediate portions within which the membrane may collapse to thereby provide ample paths to facilitate the substantially uniform distribution and flow of blood on the blood side of the membrane.

The edges at both ends of the accordion-folded semipermeable membrane 17 are sealingly embedded within plastic potting material (not shown). Similarly, both longitudinal sides of the membrane (i.e., the edges at opposite ends of the stack) are sealingly embedded within a plastic potting material 26, so that the membrane defines within the housing two separate chambers. The potting material may be a conventional epoxy or polyurethane blood-compatible material having a relatively short curing time at ordinary temperatures. After curing, the potted assembly is generally disposed within a separate housing 11 made of any suitable material such as polycarbonate, polystyrene, polymethylmethacrylate or the like or, where the header cavities are part of the housing 11 as shown, the potting of the stack and its sealing attachment within the housing may be performed simultaneously.

The interior walls of the unsupported pleats of the semipermeable membrane are essentially in contact with each other over the largest part of their surface in the absence of a fluid and therefore these pleats are essentially closed when the apparatus is not in use. While in the drawings (FIGS. 1 and 3-7) spaces have been shown between the two interior walls of the unsupported pleats for the sake of clarity, it should be understood that in fact the opposing surfaces are essentially in contact and the unsupported pleats are normally closed. These unsupported pleats are capable of opening under a fluid pressure so that, when blood is introduced into the hemodialyzer through blood inlet portion 13, it flows into the unsupported pleats and opens them to permit the flow of blood therein. The flowing blood within the hemodialyzer is always maintained at a pressure slightly greater than the pressure of the dialysate (e.g., by applying vacuum to the dialysate side) in order to drive water from the blood into the dialysate across the membrane, as it is a normal kidney function to remove excess water from the blood by ultrafiltration, and this greater pressure of the blood relative to that of the dialysate causes the separation of the normally closed unsupported pleats, thereby opening passages for the blood flow. As indicated above, some other components may also pass through the membrane.

Similarly, FIGS. 1 and 3–7 show the membrane 17 spaced from support members 18 and 19, and the paired support members in each fold or chamber spaced from each other; however, it is to be understood that such spacing is shown only for clarity of illustration and does not exist in a fully assembled apparatus.

Figure 5:
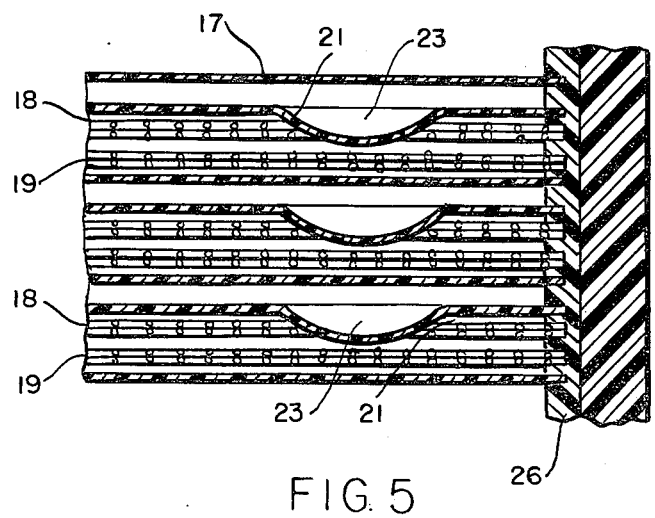
FIG. 5 is an enlarged somewhat schematic sectional view taken along the line 5—5 of FIG. 2, showing the flow pattern at one end only of the hemodialyzer, and especially the enlarged flow path for the blood provided by the slot.

FIG. 9 is a closer representation of the actual relationship of parts taking, as an example, the arrangement schematically depicted in FIG. 5. All of the mesh support members 18 and 19 of the stack are formed of the same material and, hence, the filament cross sections and pore sizes of each member are the same. While the filaments of one member are parallel to corresponding filaments of other members in the stack, the crossing points of the filaments of one member may be, and generally are, out of precise vertical alignment with the crossing points of the filaments of other members of that stack. Consequently, an arbitrary section through the stack will show only a few if any of the filaments of members 18 and 19 at their crossing points.

FIG. 9 also reveals that the opposing surfaces of the folded membrane 17 on the blood side are normally in contact with each other (in the absence of negative dialysate pressure) except in the regions of slots or recesses 23. Adjacent to slots 23, the potting material 26 holds the opposing or inside surfaces tightly together so that in operation of the hemodialyzer blood contacts only membrane 17. Specifically, the blood is incapable of contacting the spacers 18, 19 because such spacers are located only on the dialysate side, and cannot contact potting 26 because the inside surfaces of the membrane folds are held tightly together by that potting.

According to the prior art, when the blood is introduced into the hemodialyzer, with a positive difference of pressure between blood and dialysate, the membrane 17 distends into the spaces in the mesh supports 18 and 19, thereby opening the closed unsupported pleats and providing passages for blood flow through the hemodialyzer. But, as said before, with the usual hemodialysis membrane only narrow pleats can be used, as otherwise blood distribution is not uniform within the pleats, being greater on the side of the dialyzer near the blood ports and diminishing towards the side having the dialysate ports. With membranes allowing better performance, particularly in ultrafiltration and middle molecule clearance, i.e., membranes generally thicker and stiffer than the earlier membranes of lower water permeability and middle molecule clearance, it becomes still more difficult to secure the penetration of the blood in and through the apparatus, as well as its uniform distribution over the entire surface of the membrane and its flow with an acceptably low pressure drop and acceptable level of ultrafiltration. These stiffer and thicker membranes tend to form folds of greater radius at their leading edges, with the contacting leading edges at adjacent folds forming an obstruction to throttle blood flow even under negative dialysate pressure.

Figure 2:
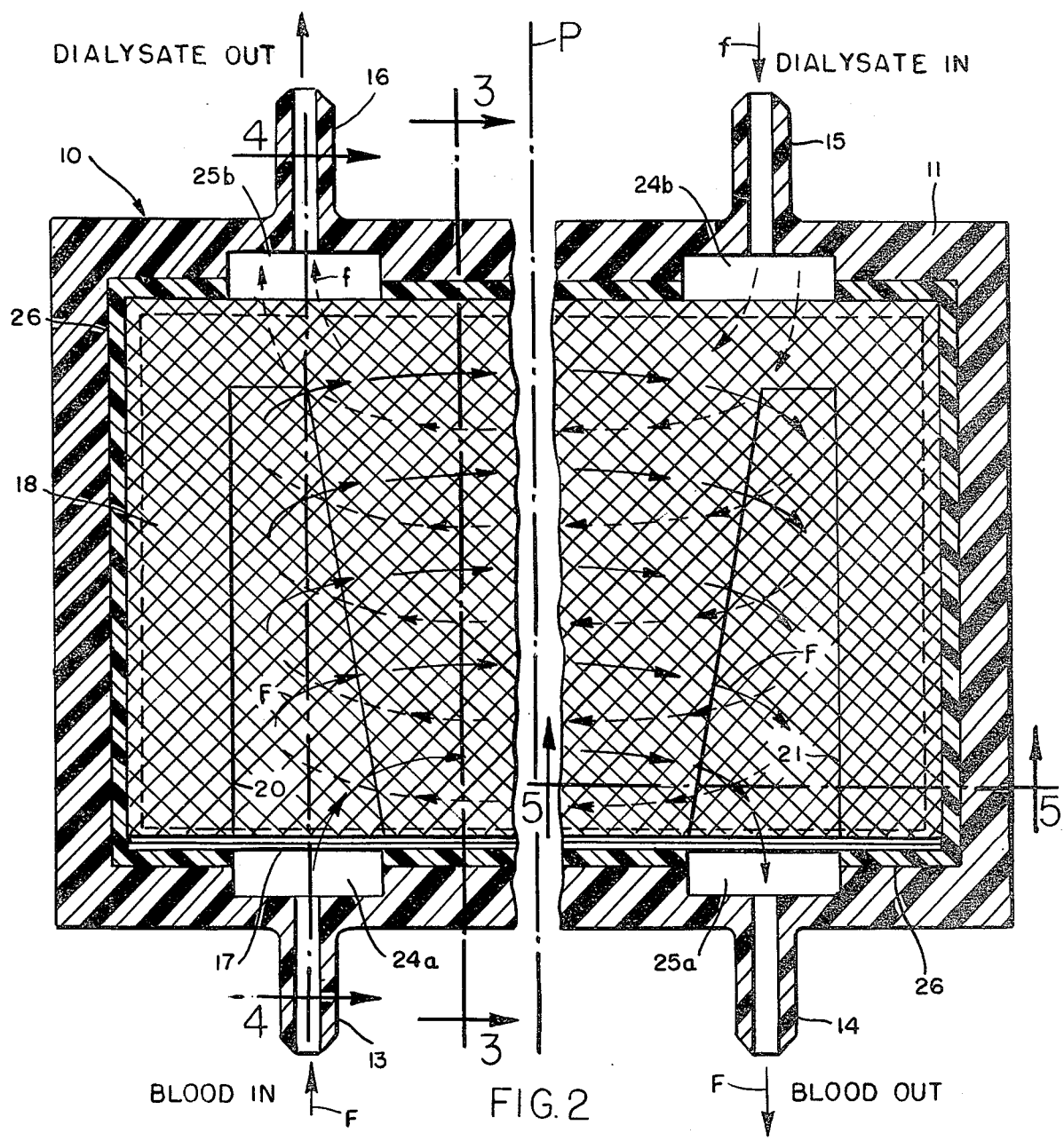
FIG. 2 is a plan view of the hemodialyzer of FIG. 1, partially in section, and with the membrane being drawn aside to expose one support member according to the present invention.

It has now been found that an improved flow of blood can be obtained if at least one of the support members within each pleat (on the blood side) is provided with at least one slot such as 20 and 21 opening on the same side of the support member and preferably in front of the inlet 13 and/or the outlet port 14 for blood—see FIG. 2. In this way the membrane billows out as it were into each slot, such as 22 and 23, for example, downwardly into such slots as shown in FIG. 5, to form a blood flow path of enlarged cross-section, from which blood is substantially evenly distributed as from a header or manifold, over substantially the entire surface of the membrane. The throttling effect at the leading edges of the folds (on the blood side) which would otherwise occur, particularly with use of the relatively stiff membranes of higher middle molecule clearance characteristics, is thereby substantially eliminated or at least greatly reduced.

Dialysate enters the hemodialyzer through dialysate inlet port 15 and distributes itself across the width of the supported pleats. Dialysate flows within the supported pleats according to the broken-line arrows f (see FIG. 2), along the length of the assembly toward dialysate outlet port 16, from which it exits from the hemodialyzer.

Blood enters the dialyzer through blood inlet port 13 and distributes itself in parallel across the width of the unsupported pleats, opening them for flow in the recess such as 22 as described above. The blood then flows within the unsupported pleats in a direction generally parallel to the creases of the pleats along the length of the housing according to the solid-line arrows F; see FIGS. 1 and 2. The blood flows on the opposite side of the semipermeable membrane 17 from the dialysate, and preferably countercurrently to the flow of dialysate, toward the recess 23 and the opposite end where it exits from the hemodialyzer through blood outlet portion 14.

Under transmembrane pressure, the portion of the membrane in contact with a slotted support member 18 bulges into the slot 22 (or 23) and into contact with the unslotted member 19 contiguous with member 18. Therefore, the paired support members 18–19 in each pleat or chamber on the dialysate side of the dialyzer accurately control the size of the enlarged transverse blood flow paths shown most clearly in FIGS. 2 and 5. In that connection, it is particularly significant that the planar support members 18 and 19 are separate or discrete elements without folds or other edge connections which might otherwise cause slight but unacceptable variations in their combined thickness and prevent the support members of the entire stack from assuming precisely parallel relation to each other. Such parallelism is essential in achieving control and reproducibility in the flow of fluid through the dialyzer and in accurately establishing the pressure drop associated with such flow.

One may have other embodiments falling with the spirit and scope of the invention. Thus, according to this invention, each of two support members may have a slot, opening on the same side, in front of the corresponding ports. Preferably these slots are located one above each other (see FIG. 6). According to this embodiment, dialysate cannot always easily flow longitudinally between the deeper recesses formed by the membrane, but the passage for blood is increased. This embodiment therefore is of special interest with relatively thick and/or relatively stiff membranes.

Figure 7:
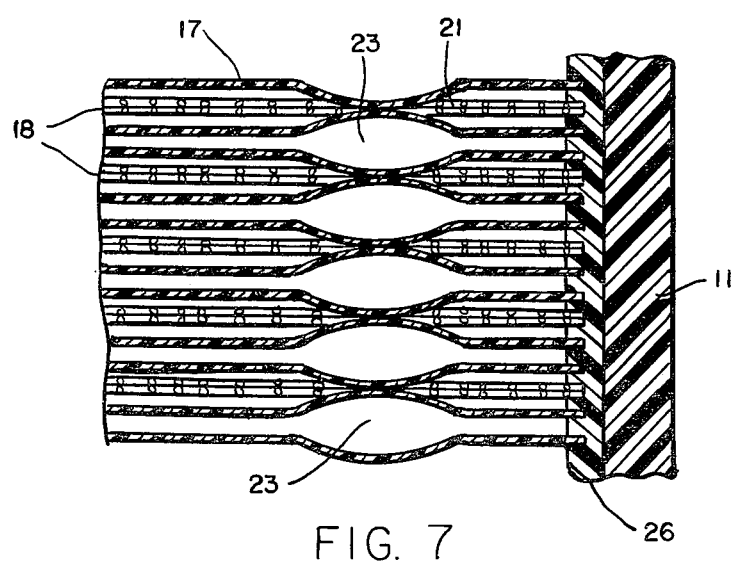
FIG. 7 is a view similar to FIG. 5 but of a third embodiment of the pesent invention, which comprises only one slotted support member disposed between every pair of pleats.

Another embodiment is shown in FIG. 7, wherein only one support member is introduced within every pair of pleats of the membrane. Each support member is provided with a slot near each of its ends and opening on the same side. The membrane is flattened against each support member and against itself in front of the slot, and thus the desired enlarged passage for blood is provided on the blood side of the membrane.

The slots extend for at least a significant part of the width of the support member. Thus the length of the slots is at least about 0.040 of an inch and may be as great as 9/10 of the width of the support member, although these exact limits are not critical. Preferably, the slots extend over the greater part of the width of the support members. The average width of the slots is from about 1/10 to 1 inch.

The support members, such as 18 and 19, may have any desired dimensions, although a particularly useful configuration is represented by a length of about 12⅜ inches, a width of about 2¾ inches, and a combined thickness for each pair of about 3/64 inch, will slots aout ⅜ inch×2 3/16 inches spaced about ⅝ inch from both ends.

Generally, the apparatus is symmetrical with respect to the transverse vertical plane P (see FIG. 2) passing through the center of the apparatus, and the slots in the support members are also generally symmetrical with respect to this plane.

Figure 6:
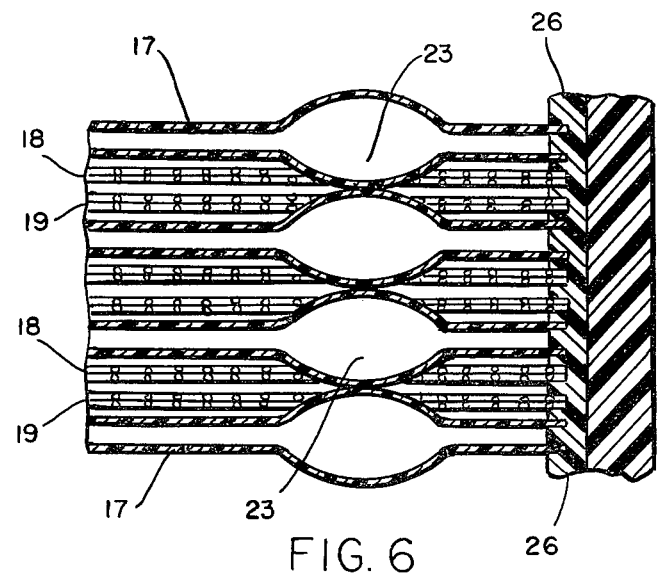
FIG. 6 is a view similar to FIG. 5 but of a second embodiment of the present invention, which comprises slots in each of the two support members disposed between every pair of pleats.

As shown in FIG. 2, the ports 13 and 14 for the blood communicate with the inside of the apparatus via enlarged channels such as 24a and 25a provided by the special shape of the wall of the housing, over the whole height of the core 12, thus constituting manifolds for the flow of blood to and from the blood side of the membrane. As there shown, the slots 20, 21 are widened at the edge of the support member 18 to about the same width as channels 24a, 25a, thereby enabling the blood to enter and leave the blood side via relatively large regions 22 and 23 resulting from the collapse of the membrane into the slots as shown in FIGS. 5, 6, and 7.

Figure 8:
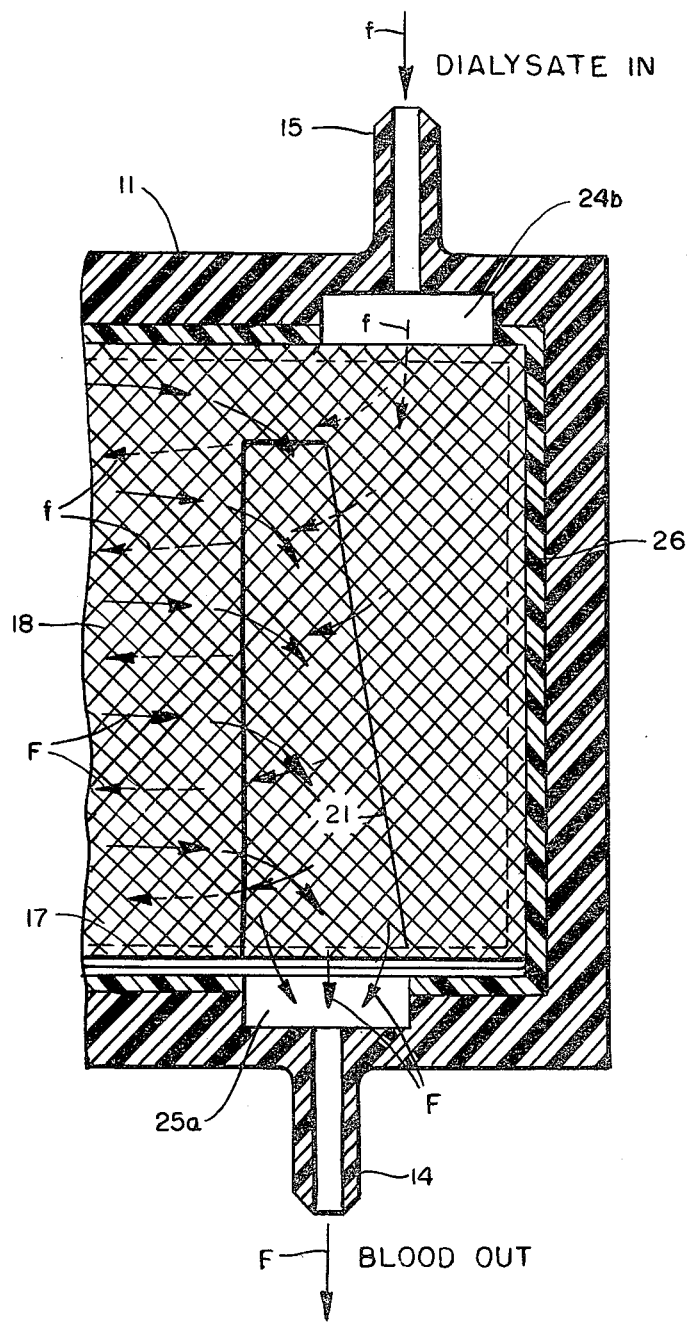
FIG. 8 is a partial plan view of the right end of another embodiment of the hemodialyzer of FIGS. 1 and 2, broken away, the membrane being drawn aside to expose one support member according to the present invention.

The channels 24b, 25b which are in communication with the dialysis ports 15 and 16 insure an even better distribution of dialysate over the whole height of the apparatus. The axes The axes of the dialysis inlet and outlet ports may be substantially in registry or slightly out of registry with the ends of the slots in the support members. Thus, FIG. 8 shows such a modificaion (right end only for simplicity) where the axes of the ports are displaced slightly outwardly with respect to the ends of the slots. The slight displacement may instead be slightly inwardly.

The support members, or spacers, used in this apparatus may be of various types per se well known in the art for maintaining a suitable spacing between adjacent folds and yet providing a minimum impediment to flow of dialysate. They are preferably formed of a plastic non-woven mesh made from two layers of threads and heat-sealed, each layer being in a different plane.

Two separate support members or only one support member may be introduced within single pleats of the semi-permeable membrane. In any event, such discrete support members are located in the pleats on only one side (the dialysate side) of the membrane, do not come into cntact with the blood, and result in dialyzer which is remarkably compact and efficient. As already described, such efficiency results in a large part from the slotting of the members which permits substantial blood flow with more uniform distribution and at a relatively low pressure drop, without the necessity and undesirable consequences) of providing spacers in the folds on the blood side of the membrane.

The slots in the support members may be formed by various means per se well known in the art, for example, by cutting, punching, sawing, melting and/or dissolving in a suitable solvent.

The apparatus has been described in a form particularly adapted for use as a hemodialyzer provided with four ports, two for blood and two for dialysate, for treatment of blood. Alternatively, there may be one port only for the exit of ultrafiltrate. In each of these cases, the features described above improve the circulation of blood or other fluid and hence the efficiency of the apparatus. This apparatus is also convenient for any other treatment of blood, for instance, as a blood oxygenator in an artificial lung.

Moreover, the terms "blood" and "dialysate" are employed herein to identify broadly any fluids flowing through the channels and ports, and are used merely for convenience of exposition and are to be construed as including other fluids. Also other types of membranes or folded sheets may be employed, as dictated by the particular fluids and by the nature of the desired transfer between the fluids.

The foregoing detailed description is to be understood as given by way of illustration and example only, the spirit and scope of this invention being limited solely by the appended claims.

What is claimed is:

1. A mass transfer apparatus for use in hemodialysis and ultrafiltration comprising a housing; a semi-permeable membrane disposed within said housing; said membrane being folded to form a stack of accordion pleats and being so constructed and arranged that two separate fluid chambers for blood and dialysate are thereby formed with said dialysate chamber being on one side of said membrane and said blood chamber on the other; ports provided by said housing for directing the flow of blood and dialysate into and out of the respective chambers; and a plurality of discrete planar support members of open-mesh plastic material associated with said membrane; said discrete support members each being flat and unfolded, of generally rectangular outline, and of substantially the same size, and being arranged to provide a pair of said members in superimposed contiguous relation within each pleat only on the dialysate side of said membrane, and being absent from the pleats on the blood side of said membrane; one support member of each contiguous pair being provided with at least one transverse slot which extends the full thickness of said one support member and in which the plastic material of said one support member is completely absent; said slot being in substantial alignment with one of said ports for directing the flow of blood into and out of said blood chamber; said transverse slot extending from an edge of said one support member facing towards said blood flow directing ports and terminating short of the opposite edge of said one support member, whereby, the portions of said one support member bordering said slot remains structurally integrated with each other.

2. The apparatus of claim 1 in which the other support member of each pair includes an open-mesh portion thereof extending across the slot of said one member to support membrane portions on opposite sides of said pair of members and to allow the flow of dialysate between said membrane portions.

3. The apparatus of claims 1 or 2 in which said slot decreases in width from the edge of said support member facing said blood ports towards the terminus of said slot.

4. The apparatus of claims 1 or 2 in which said one support member has two of said transverse slots; one of said slots being aligned with a port for directing blood into said blood chamber and the other of said slots being aligned with another port for directing blood out of said blood chamber.

* * * * *